Patented Apr. 15, 1924.

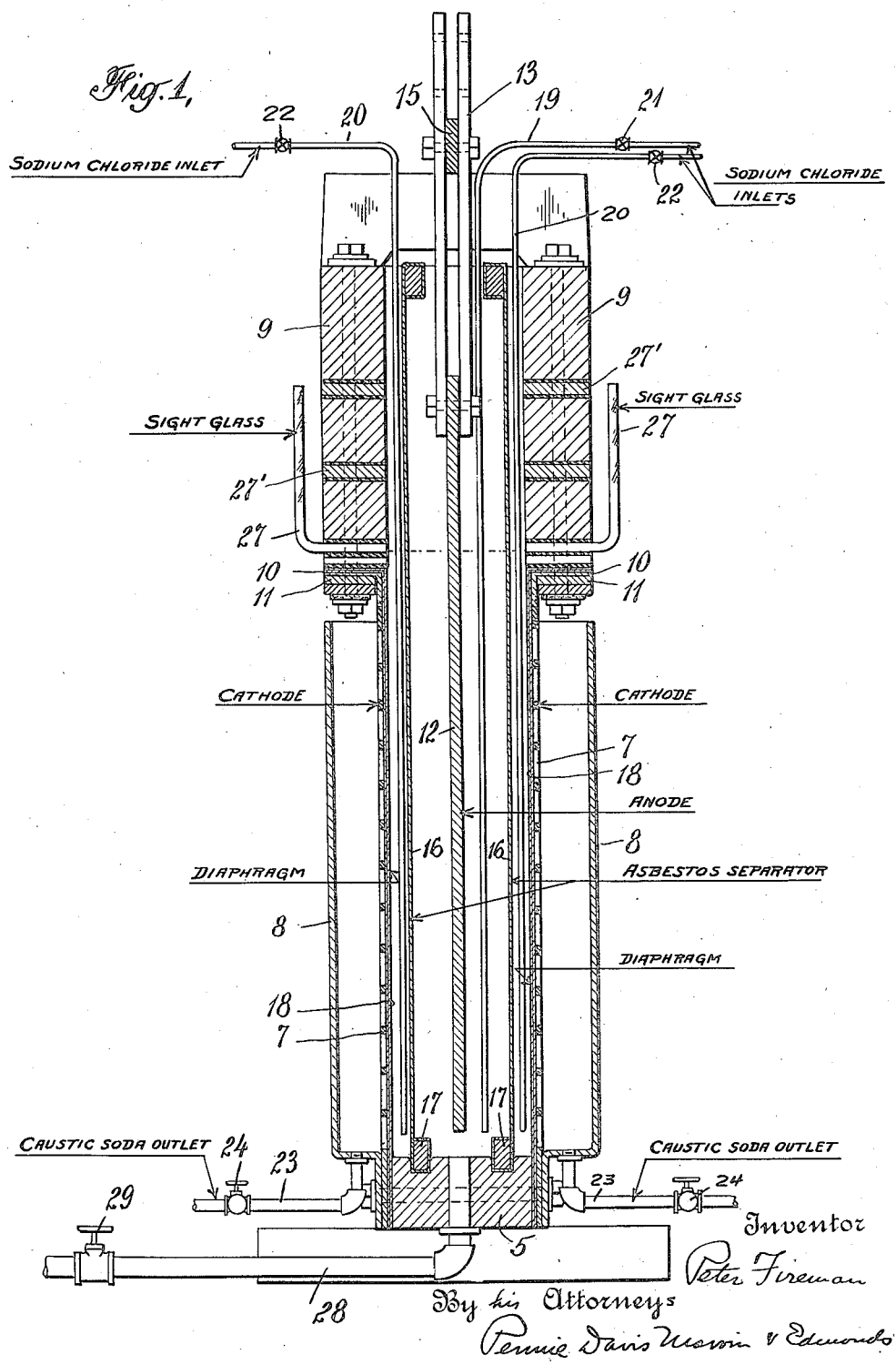

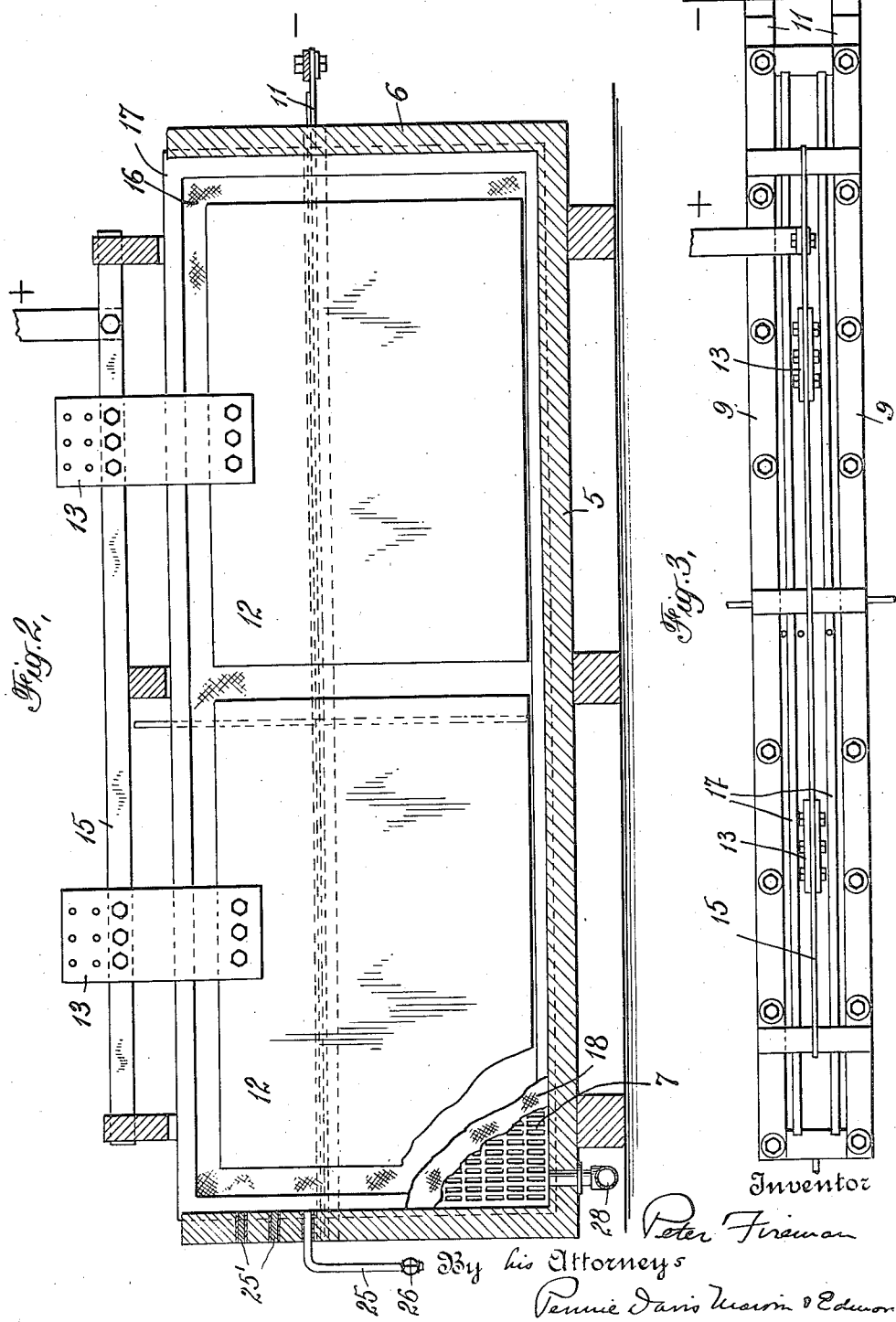

1,490,372

UNITED STATES PATENT OFFICE.

PETER FIREMAN, OF TRENTON, NEW JERSEY, ASSIGNOR TO MAGNETIC PIGMENT COMPANY, OF NEW YORK, N. Y., A CORPORATION OF NEW YORK.

METHOD OF AND APPARATUS FOR PREPARING PIGMENTS.

Application filed July 10, 1922. Serial No. 573,916.

*To all whom it may concern:*

Be it known that I, PETER FIREMAN, a citizen of the United States, residing at Trenton, in the county of Mercer, State of New Jersey, have invented certain new and useful Improvements in Methods of and Apparatus for Preparing Pigments; and I do hereby declare the following to be a full, clear, and exact description of the invention, such as will enable others skilled in the art to which it appertains to make and use the same.

This invention relates to the preparation of pigments and more particularly to the manufacture of iron oxide pigments from relatively inexpensive raw materials. The invention also includes an improved electrolytic cell in which the production of solutions intended for use in the manufacture of iron oxide pigments may be economically conducted, it being understood that the cell is not, however, necessarily limited to the use mentioned.

A development of methods for producing pigments by the regulated oxidation of precipitated ferrous hydroxide has resulted in the establishment of an industry of great commercial importance. This industry has produced black, and also brown, grey, yellow, red and purple pigments in a variety of standardized shades. The industry depends upon inventions forming the subject matter of United States Letters Patent and applications therefor. The methods described therein, depending generally upon the oxidation of freshly precipitated ferrous hydroxide, result in the production of pigments as described which have a very fine particle size and high lustre; some are transparent and others are opaque; they find extensive use in the manufacture of printing inks, paints, rubber, paper, fibre boards, leather, polishing rouges, etc.

With the increasing demand for these pigments the procurement of a suitable and adequate source of supply of raw materials for their manufacture has become a question of the greatest importance. The two classes of raw materials requisite to the industry are iron salts and precipitating bases. Of the former class, in practice, either iron sulphate or iron chloride is generally used; of the latter class, there are lime, sodium carbonate, caustic soda and other soluble hydroxides or carbonates of the alkali or alkali earth metals. The most suitable iron salt is the chloride of iron, because lime, the cheapest precipitating agent, can be used for precipitating ferrous hydroxide therefrom. Lime cannot be used with iron sulphate without contaminating the resulting pigment with an equivalent quantity of insoluble calcium sulphate. Furthermore, with the use of iron chloride a greater variety of colors is available.

Of the bases, or precipitating agents, lime is to be preferred because of its relatively low cost. However, from the point of view of purity, lime has the disadvantage of unavoidably carrying some silicious gangue which passes ultimately into the pigment.

It has been suggested to make use of the so-called pickling liquors, such as the waste solutions obtained from cleaning the metal of iron and steel articles of manufacture and at steel works, as a source of iron salts for the manufacture of iron oxide pigments. This material has some disadvantages. In the majority of cases sulfuric acid or a salt of sulfuric acid in solution is used in the cleaning liquor and in such cases, as previously explained, lime cannot be used for precipitating the iron. It is necessary to use caustic soda, sodium carbonate or other relatively expensive bases.

I have discovered that the essential materials can be economically prepared by decomposing a solution of an alkali metal salt such as common salt in an electrolytic cell having a soluble iron anode. In the electrolysis the anode dissolves to form iron chloride in the anode chamber while caustic soda is formed in the cathode chamber. Preferably a saturated solution of sodium chloride is used as the electrolyte and the products are brine solutions containing sodium hydroxide and ferrous chloride respectively. These solutions as formed are of suitable strength and purity for immediate recombination. The soluble anode must be replaced, of course, from time to time as it is dissolved.

The solutions thus provided are combined to precipitate ferrous hydroxide which is subjected in the mother liquor to oxidation as described in Letters Patent No. 802,928, No. 857,044, No. 1,424,635, No. 1,392,925, No.

1,392,926, No. 1,392,927 and No. 1,420,985 granted to me. The mother liquor, consisting in the specific case mentioned of sodium chloride, is returned to the electrolyzer for further use in the decomposition of the iron anode.

One of the principal objects of the present invention is the production of an iron salt and a precipitating base by one operation and in the most desirable condition for carrying out the production of pigments as described in the Letters Patent and applications referred to.

Although the method herein described is not necessarily conducted in the apparatus which is illustrated in the accompanying drawing, it is one of the objects of the invention to provide an apparatus in which some solutions may be prepared economically and from which they may be separately withdrawn without precipitation of ferrous hydroxide since this material would form a voluminous mass of a gelatinous nature, and it is essential, therefore, that the solutions be prevented from combining with the electrolytic cell.

The invention will be more clearly understood from the following description when read in connection with the drawing, in which—

Fig. 1 is a transverse section through an electrolytic cell according to the invention;

Fig. 2 is a longitudinal section through the cell; and

Fig. 3 is a plan view thereof.

I have discovered that the desired separation of the sodium hydroxide and ferrous chloride may be readily accomplished in an electrolytic cell by the utilization of suitable separating walls between the anode and the cathode which prevent diffusion of the solutions while the cell is in operation. It is to be understood that these separating walls are not absolutely necessary since by the application of suitable precautions the solutions formed may be withdrawn from the cell as rapidly as they are produced and without substantial intermingling. In carrying out the invention the solutions are thus withdrawn whether or not the separating walls are employed. The separating walls do, however, ensure the proper functioning of the apparatus under varying conditions and are advantageously disposed for this reason between the soluble iron anode and the iron cathodes. Preferably the separating walls consist of one or more sheets of asbestos paper. The number and thickness of the sheets of asbestos forming the separating walls and the particular arrangement of these walls within the cell may vary, depending on different factors affecting the operation of the cell. In this operation the salt solution containing ferrous chloride forms about the anode whereas the salt solution containing sodium hydroxide flows away through perforations in the cathodes into chambers provided for that purpose.

Referring to the drawing, the cell is preferably constructed of bottom and end members 5 and 6 respectively which may be of wood or other suitable material bolted or otherwise secured together. The sides of the cell consist of perforated iron plates 7 bolted to the bottom and end members and forming the cathodes. Plates 8 are secured to the frame outside the perforated plates 7 to prevent escape of the caustic solution. The upper parts of the side walls may be constructed of wood as indicated at 9 and are preferably bolted to suitable flanges 10 on the perforated plates 7. These extensions of the side walls merely serve to permit an increase of head of the electrolyte within the cell.

The perforated plates 7 are connected by conductors 11 to a source of electric current suitable for use in the electrolysis. An iron anode 12 is suspended by supports 13 from a conducting bar 15 which is also connected to the source of current. The anode is arranged in the cell mid-way between the perforated plates 7 and is separated therefrom by separating walls 16 consisting of sheets of asbestos paper supported on frames 17. Preferably the bottom and end members 5 and 6 of the cell are grooved to receive the edges of the frame 17 so that the separating walls are rigidly held in proper position. Diaphragms 18, each consisting of one or more sheets of asbestos paper, are supported against the faces of the perforated plates 7 and permit the caustic solution to pass through the perforated plates and thus from the cell.

The salt solution, preferably a saturated solution of sodium chloride, is supplied to the cell through pipes 19 and 20 provided with valves 21 and 22 whereby the flow of liquid therethrough may be controlled. The pipe 19 delivers the salt solution to the inner compartment of the cell adjacent the bottom of the anode, and the pipes 20 similarly deliver the salt solution to the outer compartments of the cell adjacent the bottom of the separating walls 16. The salt solution is fed continuously to the cell while it is in operation, and consequently a fresh supply of undecomposed solution is always interposed between the caustic and ferrous chloride solutions to assist in preventing combination of these two solutions.

The sodium hydroxide solution is withdrawn continuously through pipes 23 as it flows through the diaphragms 18 and trickles down over the outer faces of the cathodes. Valves 24 are provided in the pipes 23 to regulate the flow of sodium hydroxide therethrough. The ferrous chloride solution is similarly withdrawn through a pipe 25 controlled by a valve 26 at one end of the cell. The outlet pipe for the ferrous chloride solution may be adjusted by the provision of suitable openings in which it may be inserted so that the solution may be taken off at the desired level. The openings, when not in use, are closed by the use of suitable plugs 25. Sight glasses 27 are similarly inserted through openings in the walls 9 of the cell and serve to permit observance of the level of the liquid in the cell. A number of openings are provided in which the sight glasses may be inserted. The openings not in use are closed by plugs 27'. These sight glasses may be connected to the chambers formed by the plates 8 so that in the event that the solution overflows, it will pass into the outlet pipes for the sodium hydroxide and will not therefore be wasted. A waste pipe 28 having a valve 29 communicates with the inner compartment of the cell and is utilized in cleaning the cell whenever renewals of the essential parts of the cell are necessary.

As an example of the application of the invention the cell may be approximately four feet long and five inches wide with cathode plates approximately twenty inches deep. The anode may have a thickness of approximately one-half inch and may be in several sections as illustrated, or in the form of a single plate. A cell such as described may be operated with four hundred and twenty amperes and a voltage of 3.45. The resulting caustic solution may be readily allowed to reach a strength of 16 per cent without impairment of the almost theoretical efficiency.

From the foregoing description the operation will be readily understood. The salt solution is supplied in regulated amounts to the inner and outer compartments of the cell and the anode and cathodes being respectively connected to the source of current, electrolysis of the solution results in the production of sodium hydroxide which passes through the diaphragms, and a corresponding production of ferrous chloride in the inner compartments of the cell. The two brine solutions containing sodium hydroxide and ferrous chloride respectively are separately withdrawn through the outlets provided for this purpose and may be utilized in any desired manner, but particularly for re-combination for the purpose of precipitating ferrous hydroxide which may be oxidized thereafter to form iron pigments.

The advantages of the cell as described are, simplicity of its construction and the consequent ease with which it may be assembled and maintained, and particularly the effective separation of the solutions of sodium hydroxide and ferrous chloride which when combined produce a precipitate capable of preventing effective operation of the cell. Experience with the cell described has demonstrated that the cell may remain continuously in operation. The current efficiency of the cell is remarkable and the voltage required is considerably lower than in the electrolysis of common salt with a carbon anode. Thus, the desired solutions may be economically prepared, particularly where current is available at low rates.

The method of the present invention accomplishes two important things; it produces the most desirable raw materials for the preparation of iron pigments, i. e., ferrous chloride and caustic soda in one reaction, and produces both of them in the most desirable form and state of purity for immediate use for the precipitation of ferrous hydroxide in suitable condition for oxidation in the manner described. The presence of the salt in the solutions has a particularly beneficial effect upon the nature of the pigments which have a finer structure and greater brilliance when the raw materials are produced in the manner hereinbefore described and are used subsequently in saturated solutions.

The cost of the raw materials is reduced to the cost of scrap iron, common salt and electric power. Of these three items of expense, only that of electric power is of serious consequence. The success of the method described herein is greatest if carried out where cheap electric power is available, such as is obtainable through the utilization of water power or natural gas. The quantity of electric power corresponding to one horse power per year will yield raw material sufficient to produce over two and one-half tons of iron oxide pigments. The initial cost of the salt used is slight. Moreover, the greater part of this salt is recovered in the subsequent precipitation of the ferrous hydroxide and may be reused.

Glauber salt (sodium sulphate) may be used instead of common salt and will answer the purpose equally well. Other soluble salts of the alkali metals such as sodium nitrate, sodium bromide, sodium acetate, potassium chloride, etc., may be used for certain specific effects when a greater variety of colors is required. It is clear that the use of such other salts would not materially increase the cost of production of the raw materials when it is borne in mind that these salts are substantially all recoverable in the subsequent precipitating operation.

The present invention provides a method of and an apparatus whereby a cheap and unlimited source of supply of raw materials such as required for the manufacture of iron oxide pigments may be obtained.

Various changes may be made in the details of the invention without departing

I claim:—

1. The method of producing iron oxide pigments, which comprises electrolyzing a salt of an alkali metal in the presence of an iron anode, thereby producing a solution of an iron salt and an alkaline solution, separately withdrawing the iron and alkaline solutions from the electrolytic zone and recombining the solutions to precipitate ferrous hydroxide.

2. The method of producing iron oxide pigments, which comprises electrolyzing a salt of an alkali metal in the presence of an iron anode, thereby producing a solution of an iron salt and an alkaline solution, separately withdrawing the iron and alkaline solutions from the electrolytic zone, recombining the solutions to precipitate ferrous hydroxide, and oxidizing the ferrous hydroxide under predetermined conditions.

3. The method of producing iron oxide pigments, which comprises electrolyzing a salt of an alkali metal in the presence of an iron anode, thereby producing a solution of an iron salt and an alkaline solution, separately withdrawing the iron and alkaline solutions from the zone of electrolysis, recombining the solutions to precipitate ferrous hydroxide, oxidizing the ferrous hydroxide under predetermined conditions, separating the pigment from the mother liquor and returning the mother liquor for further electrolysis.

4. The method of producing iron oxide pigments, which comprises electrolyzing sodium chloride in the presence of an iron anode, thereby producing brine solutions containing ferrous chloride and sodium hydroxide respectively, separately withdrawing ferrous chloride and sodium hydroxide solutions from the zone of electrolysis, recombining the solutions to precipitate ferrous hydroxide and oxidizing the ferrous hydroxide under predetermined conditions.

5. The method of producing iron oxide pigments, which comprises electrolyzing sodium chloride in the presence of an iron anode, thereby producing brine solutions containing ferrous chloride and sodium hydroxide, separately withdrawing the ferrous chloride and sodium hydroxide solutions from the zone of electrolysis, recombining the solutions to precipitate ferrous hydroxide, oxidizing the ferrous hydroxide under predetermined conditions to produce a pigment, separating the pigment from the sodium chloride and returning the sodium chloride for further electrolysis.

6. In an electrolytic cell, the combination with a soluble anode of a perforated cathode plate forming a wall of the cell and a diaphragm closely adjacent the cathode plate and acting as a filter medium.

7. In an electrolytic cell, the combination with a soluble anode of a perforated cathode plate forming a wall of the cell, a diaphragm closely adjacent the cathode plate and acting as a filter medium, and means for supplying electrolyte to and withdrawing products from the cell.

8. In an electrolytic cell, the combination with a soluble anode of perforated cathode plates forming the opposite walls of the cell, and diaphragms closely adjacent the cathode plates and acting as filter media.

9. In an electrolytic cell, the combination with a soluble anode of perforated cathode plates forming the opposite walls of the cell, diaphragms closely adjacent the cathode plates and acting as filter media, and porous separating walls dividing the spaces between the anode and cathodes into separate compartments.

In testimony whereof I affix my signature.

PETER FIREMAN.